United States Patent [19]
Duke, Jr.

[11] 3,855,268
[45] Dec. 17, 1974

[54] OXYDEHYDROGENATION OF ORGANIC NITRILES

[75] Inventor: Roy B. Duke, Jr., Littleton, Colo.

[73] Assignee: Marathon Oil Company, Findlay, Ohio

[22] Filed: July 3, 1969

[21] Appl. No.: 839,045

[52] U.S. Cl......... 260/465.3, 260/465.2, 260/465.8, 260/465.9, 260/239 R, 260/465 C, 260/465 K, 260/465 B
[51] Int. Cl........................................ C07c 121/02
[58] Field of Search.......... 260/465.9, 465.8, 465 K, 260/239 R, 465.3, 465.8 R

[56] References Cited
UNITED STATES PATENTS

| | | | |
|---|---|---|---|
| 2,010,358 | 8/1935 | Groll et al. | 260/530 |
| 2,554,482 | 5/1951 | Brown | 260/465.9 |
| 2,554,484 | 5/1951 | Loder | 260/465.9 |
| 2,590,986 | 4/1952 | MacLean et al. | 260/465.2 |
| 2,694,734 | 11/1954 | Hagemeyer, Jr. et al. | 260/604 |
| 2,732,397 | 1/1956 | Hull | 260/465.2 |
| 2,748,167 | 5/1956 | Hagemeyer, Sr. et al. | 260/604 |
| 3,080,435 | 3/1963 | Nager | 260/465.9 UX |
| 3,207,805 | 9/1965 | Gay | 260/465.9 X |
| 3,207,806 | 9/1965 | Bajars | 260/465.9 X |
| 3,547,972 | 12/1970 | Drinkard, Jr. | 260/465.3 |

*Primary Examiner*—Joseph P. Brust
*Attorney, Agent, or Firm*—J. C. Herring; Richard C. Willson, Jr.; Jack L. Hummel

[57] ABSTRACT

A method of oxydehydrogenating nitriles, of the following general formula:

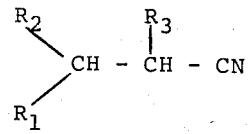

where $R_1$, $R_2$, and $R_3$ may be hydrogen, alkyl, alkenyl, alkynyl, alicyclic, aryl, or heterocyclic groups, or mixtures thereof, particularly propionitrile and isobutyronitrile, which involves the steps of forming a reaction mixture comprising the nitrile, a promoter in the form of iodine or an iodine-containing compound, and oxygen, or an oxygen-containing gas, passing the mixture, first, over a substantially inert material and then over a catalyst exemplified by copper chromite, while maintaining the reaction mixture at a temperature of from about 300°F to about 1300°F.

16 Claims, No Drawings

OXYDEHYDROGENATION OF ORGANIC NITRILES

Various methods of oxydehydrogenating nitriles are known such as propionitrile and isobutyronitrile to produce acrylonitrile and methacrylonitrile, respectively. Exemplary methods having utility for this purpose are those disclosed in U.S. Pat. Nos. 3,207,805, 3,308,186, 3,308,188, 3,308,190, 3,308,192, 3,308,193 and 3,308,198. While the yields obtained in the practice of these methods are reasonably good, the methods have a number of disadvantages, particularly from an economic standpoint, chief among which are the relatively high temperatures, usually of the order of 650°C to 750°C, employed in carrying out the oxydehydrogenation reaction, and the comparatively low selectivities manifested, the highest reported in the aforementioned patents being 0.76.

In accordance with the present invention, an improved method of oxydehydrogenating nitriles, especially propionitrile and isobutyronitrile to produce acrylonitrile and methacrylonitrile, respectively, has been evolved which, among other things, can be carried out at appreciably lower temperatures than is possible with heretofore used methods, and which, furthermore, uniformly gives substantially higher selectivities than are attainable with the aforementioned methods.

Briefly, the method of the present invention involves the steps of forming a reaction mixture comprising a nitrile, having the structure shown in the Abstract of the Disclosure, preferably, propionitrile or isobutyronitrile, iodine or an iodine-containing compound, and oxygen or an oxygen-containing gas, passing the mixture, initially, over a substantially inert material, and immediately thereafter passing the mixture over a catalyst, while maintaining the reaction mixture at a temperature sufficient to effect catalytic oxydehydrogenation of the nitrile. While the reaction is carried out in two stages, the initial passage of the reaction mixture over the substantially inert material and its subsequent passage over the catalyst is carried out advantageously in a continuous operation in a single reactor. The effect on the reaction mixture resulting from its initial contact with the substantially inert material is not known; however, it is known and also illustrated in the Examples of this application, that this practice consistently provides improved selectivites of the order of 0.80 to 0.90, or higher.

While the method of the present invention will be described in detail hereinafter with particular reference to its application to the oxydehydrogenation of propionitrile and isobutyronitrile to produce acrylonitrile and methacrylonitrile, respectively, it should be understood that the description with relation thereto is presented only by way of illustrating the method of the invention and should not be construed as limiting its broader aspects. Thus, the method can be utilized for the oxydehydrogenation of various other organic nitriles exemplary of which are valeronitrile, capronitrile, caprylonitrile, myristonitrile, and the like. The nitriles will contain preferably 3–30, more preferably 3–10, and most preferably 3–6 carbon atoms, and can be in the form of mixtures.

As indicated, a promoter in the form of iodine, or an iodine-containing compound, is employed in carrying out the method of the present invention. Specific examples of iodine-containing compounds which can be used are hydroiodic acid, interhalogens, exemplified by iodine monobromide and iodine monochloride. Of the interhalogens, iodine monobromide is preferred. The amount of iodine, or iodine-containing compound, utilized in forming the reaction mixture is somewhat variable. Generally speaking, however, the iodine or iodine-containing compounds, should be present in the reaction mixture in an amount ranging from about 0.001 to about 0.1 mole thereof for each mole of nitrile present.

The oxygen component of the reaction mixture may comprise pure oxygen, or it may be supplied in the form of air, or in dilution with an inert gas such as helium, nitrogen, or carbon dioxide. The quantity of oxygen used should be at least 0.01 mole per mole of nitrile present. In accordance with the preferred practice of the invention, about 0.05 to about 3, and most preferably from about 0.2 to about 1.3, moles of oxygen per mole of nitrile should be present in the reaction mixture.

The substantially inert materials utilized in carrying out the method can be characterized as those materials which do not react to any appreciable extent, at the temperatures employed, with the halogen promoter. Exemplary of inert materials useful for the purposes of this invention are glass, carborundum, clay, ceramics, pumice, vermiculite, granular rock, and the like. Alternatively, void space in the reactor may be employed instead of the inert materials.

The preferred catalysts for use in our invention are chromites of the general formula:

where $i$ is the valence state of metal, M; $j$ and $k$ are integers such that $$j = 2k/i$$

and M is preferably an element from groups IIa, IVa, Va, or Ib through VIIb and VIII of the Periodic Table. Rare earth element chromites are also excellent catalysts. Mixtures of several chromites are also acceptable catalysts, as well as chromites containing lesser amounts of oxides, hydroxides, or salts of the elements of group Ia of the Periodic Table.

The preferred catalyst for use in our invention is a copper chromite composition. Such catalysts may be obtained commercially or may be prepared by one skilled in the art. Commercially available catalysts such as Girdler's G-22 and T-531, or Harshaw's Cu-1800 and Cu-1106 are suitable. Alternatively, the copper chromite catalysts may be prepared by thermally decomposing copper chromate, or by other methods employed by those skilled in the art. A review of the various routes to chromites may be found in the following references: *Chromium*, M. J. Udy, Reinhold Publishing Co., New York, 1956 and *Reactions of Organic Compounds over Copper-Chromium Oxide and Nickel Catalysts*, Homer Adkins, University of Wisconsin Press, 1937. The chromite catalysts may be tableted for use in fixed bed reactor or may be pulverized and sized for use in fluidized bed reactors. The tableted catalysts may contain binders such as sodium silicate, or may be supported on carriers such as Kieselguhr, alumina, silica, magnesia, or pumice. The surface areas of the catalysts range between 0.1 and 300 square meters per gram.

The flow rates of the gaseous components of the reaction mixture can be varied within appreciable limits.

The optimum conditions of the invention are attained with nitrile flow rates ranging from about 0.01 to about 10, but more preferably between about 0.1 to about 1, liquid volumes of the nitrile per volume of reactor packing per hour. Gaseous hourly space velocities employed in carrying out the invention range from about 5 to about 1500 hr$^{-1}$, but preferably between 10 to about 1000 hr$^{-1}$, and most preferably between about 50 to about 500 hr$^{-1}$. Gaseous hourly space velocity, abbreviated GHSV, is defined as the volume of total feed vapor, calculated under standard conditions of temperature and pressure, passed per hour per unit volume of the substantial inert material zone and the catalyst zone in a reactor utilized in carrying out the method.

The temperatures employed in carrying out the method also can be varied. Generally speaking, the temperature of the reaction mixture in the substantially inert material zone and the catalyst zone of the reactor used will be essentially the same. Thus, the temperature at which the reaction mixture is passed over the first-mentioned zone will range from about 300°F to about 1300°F, but preferably from about 600°F to about 1200°F, while the temperature of the reaction in the catalyst zone will range from about 350°F to about 1300°F, but preferably between about 600°F to about 1200°F.

The reactors useful in the practice of this invention are constructed or lined with titanium, tantalum, nickel, or alloys containing one or more of these metals. Examples of useful alloys of nickel include the stainless steels, the Hasteloys, the Inconels, and the Incoloys. The reactor shape is not of importance, although tubes are most convenient. The upper portion of the reactor is packed with an inert substance such as ceramic beads, mullite spheres, carborundum chips, glass beads, vermiculite, or naturally occurring granular rocks over which the reaction mixture is passed prior to entering the catalyst section of the reactor, thus providing a two-stage reactor. The improved yields obtainable with said two-stage operation, particularly when iodine is used as the promoter, are illustrated by comparing Examples I and II with Examples III, IV and V. Examples I and II illustrate the yields and selectivities attainable with the reactor filled entirely with either inert materials or catalyst and Examples III, IV, and V illustrate the improved yields and selectivities attainable with the preferred two-stage process. Our copending case, Ser. No. 722,170, now abandoned, also illustrates the improved yields obtainable with two-stage operation. Alternatively, the reactants may be preheated in tubes, pipes, etc. made of the above mentioned alloys or other materials which are substantially inert, such as clays, mullite, or other ceramic compositions. The ratio of the volume of inert to the volume of catalyst can be varied to suit the particular feed and conditions employed. In general, the inert-zone volume will be preferably 0.2 to 20, more preferably 0.4 to 5, and most preferably 0.6 to 2 times the volume of the catalyst zone.

The pressures employed in the practice of the method are not critical. Generally speaking, oxydehydrogenation of the nitrile can be effected at pressures ranging anywhere from about 0.01 to about 100 atmospheres, but preferably between about 0.1 to 10 atmospheres, and most preferably about one atmosphere.

EXAMPLES

The following examples are illustrative of the oxydehydrogenation process of the present invention. It should be understood that various changes may be made therein in the light of the guiding principles disclosed above without departing from the fundamental teachings contained herein.

The following examples are carried out in Type 316 stainless steel, tubular reactors, one inch in diameter and 26 inches long, which have a 0.25 inch internal thermowell extending the length of the reactor. The reactor is heated in a furnace and the temperature controlled and recorded from thermocouples located inside the thermowell. The lower-half of the reactor is filled with a tableted chromite catalyst, and the upper-half with a substantially inert material, such as ceramic beads, burl saddles, mullite spheres, vermiculite, crushed rock and the like.

The nitrile to be oxydehydrogenated is fed to a mixing tee by means of a calibrated metering pump, where it is mixed with air or oxygen (apportioned through a calibrated rotometer). The iodine used to promote the reaction is usually dissolved in the nitrile; however, it may be metered separately to the mixing tee. The resulting reaction mixture is then passed through the reactor. Flow rates are calculated in terms of gaseous hourly space velocity (GHSV). All liquids charged to the reactor are assumed to be ideal gases and STP.

The gaseous effluent from the reactor is passed first through a series of water-cooled condensers, and then through a dry-ice trap, where the reaction products and unreacted starting materials are condensed and recovered. The conversions, yields, and selectivities are calculated on the amount of condensable product after suitable analysis in the following manner:

$$\text{Conversion (\%)} = \frac{100(\text{moles of saturated nitrile reacted})}{(\text{moles of saturated nitrile charged})}$$

$$\text{Yield (\%)} = \frac{100(\text{moles of unsaturated nitrile})}{(\text{moles of saturated nitrile charged})}$$

$$\text{Selectivity} = \frac{\text{yield}}{\text{conversion}}$$

The products are separated and quantitatively analyzed by chromatographic techniques. Structures of the products are verified by ultraviolet, infrared, and nuclear magnetic resonance spectroscopy, elemental analysis and physical properties. The following examples employ the abovementioned procedures and apparatus.

EXAMPLE I (All inert, no chromite)

Isobutyronitrile, containing 2% iodine, is oxydehydrogenated under the following conditions:

| Temperature | |
|---|---|
| Upper Section (Ceramic Beads) | 1050°F |
| Lower Section (Ceramic Beads) | 1050°F |
| GHSV | 151 hr$^{-1}$ |
| O$_2$/Isobutyronitrile | 0.20 |

The conversion, yield, and selectivity to methacrylonitrile are 35.0%, 25.1%, and 0.719, respectively.

EXAMPLE II (all catalyst, no inert)

Isobutyronitrile, containing 2% iodine, is oxydehydrogenated under the following conditions:

Temperature

| | |
|---|---|
| Upper Section (catalyst) | 1050°F |
| Lower Section (catalyst) | 1050°F |
| GHSV | 150 hr$^{-1}$ |
| O$_2$/Isobutyronitrile | 0.20 |
| Catalyst 10% Barium Oxide - 30% Copper Chromite (Remainder binder in all Examples) | |

The conversion, yield, and selectivity to methacrylonitrile are 23.5%, 14.8% and 0.631, respectively.

EXAMPLE III (According to the invention, using inert and catalyst zones)

Isobutyronitrile, containing 2% iodine, is oxydehydrogenated under the following conditions:

Temperature

| | |
|---|---|
| Upper Section (ceramic beads) | 1050°F |
| Lower Section (catalyst) | 1050°F |
| GHSV | 148 hr$^{-1}$ |
| O$_2$/Isobutyronitrile | 0.26 |
| Catalyst 10% Barium Oxide - 30% Copper Chromite | |

The conversion, yield, and selectivity to methacrylonitrile are 36.4%, 32.4%, and 0.891, demonstrating the superior selectivites achieved by the invention.

EXAMPLE IV (According to the invention using inert and catalyst zones)

Isobutyronitrile, containing 2% iodine, is oxydehydrogenated under the following conditions:

Temperature

| | |
|---|---|
| Upper Section (ceramic beads) | 1050°F |
| Lower Section (catalyst) | 1050°F |
| GHSV | 149 hr$^{-1}$ |
| O$_2$/Isobutyronitrile | 0.20 |
| Catalyst 10% Barium Oxide - 30% Copper Chromite | |

The conversion, yield, and selectivity to methacrylonitrile were 20.5%, 17.2%, and 0.840, respectively.

EXAMPLE V (According to the invention, using inert and catalyst zones)

Isobutyronitrile, containing 2% iodine, is oxydehydrogenated under the following conditions:

Temperature

| | |
|---|---|
| Upper Section (ceramic beads) | 1000°F |
| Lower Section (catalyst) | 1000°F |
| GHSV | 150 hr$^{-1}$ |
| O$_2$/Isobutyronitrile | 0.51 |
| Catalyst 10% Potassium Oxide - 30% Copper Chromite | |

The conversion, yield, and selectivity to methacrylonitrile were 43.2%, 34.6%, and 0.801, respectively.

EXAMPLE VI (According to the invention, using inert and catalyst zones)

Propionitrile, containing 2% iodine, is oxydehydrogenated under the following conditions:

Temperature

| | |
|---|---|
| Upper Section (berl saddles) | 1000°F |
| Lower Section (catalyst) | 1000°F |
| GHSV | 176 hr$^{-1}$ |
| O$_2$/Propionitrile | 0.26 |
| Catalyst | 40% Copper chromite |

The conversion, yield, and selectivity are substantially the same as shown in Example III using isobutyronitrile.

Modifications

As a preferred modification of the disclosed process, methacrylonitrile is prepared from propylene by the following multi-step process:

1. Propylene is reacted catalytically with hydrogen and carbon monoxide according to the basic oxo process to give the mixture of n-butyraldehyde and isobutyraldehyde, said oxo process being conducted at molar ratios of hydrogen to carbon monoxide in the synthesis gas ranging from about 1:1 to about 3:1, and at temperatures ranging between 100 and 300°C, but preferably between 140 and 250°C and at pressures ranging from 40 to 700 atmospheres, but preferably between 250 and 400 atmospheres, employing contact times of less than 10 minutes and preferably between 1 and 5 minutes, said reaction being carried out in either the liquid or the gaseous phases employing catalysts such as salts of cobalt, copper, chromium, ruthenium, rhodium, but preferably cobalt.
2. Separation of isobutyraldehyde from n-butyraldehyde by fractionation.
3. Oxidation of isobutyraldehyde to isobutyric acid, said oxidation being carried out either catalytically or non-catalytically, using oxygen or an oxygen-containing gas as the oxidizing agent.
4. Conversion of isobutyric acid to isobutyronitrile by reacting isobutyric acid with ammonia over a catalyst such as natural or synthetic zeolites, alumina, silica gel, silica alumina, and the like at temperatures ranging from about 200 to about 600°C and at pressures ranging from about 1 to about 100 atmospheres.
5. Oxydehydrogenating isobutyronitrile according to the present process to give methacrylonitrile.

As another preferred modification of the invention, the isobutyraldehyde from step 2 in the primary modification is oxidized catalytically or non-catalytically to periosbutyric acid, said perisobutyric acid is then contacted with an olefin, such as propylene, to give propylene oxide and isobutyric acid, said oxidation being carried out at 50–200°C, using oxygen or oxygen-containing gas as the oxidizing agent. Transition metal salts may be used as catalysts, such as salts of titanium, chromium, magnanese, iron or cobalt. The isobutyric acid from the epoxidation step is then converted to methacrylonitrile according to the initial preferred modification of this invention.

As another preferred modification of the invention, isobutyraldehyde is converted directly to isobutyronitrile by reacting said aldehyde withh oxygen, or an oxygen-containing gas, and ammonia, in the liquid or vapor phase over catalysts such as alumina, silica gel, molecular sieves, silica alumina, vanadia and the like at temperatures ranging from about 200 to 600°C, and at pressures ranging from 1 to 100 atmospheres. The isobutyronitrile thus obtained is subsequently oxydehydrogenated to methacrylonitrile according to the process of this invention.

What is claimed is:

1. A process for oxydehydrogenating nitriles of the general formula:

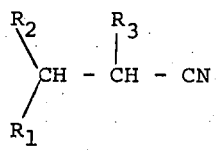

where $R_1$, $R_2$, and $R_3$ are selected from the group consisting of hydrogen, alkyl, alkenyl, aryl and mixtures thereof, and wherein the nitrile contains from 3 to 30 carbon atoms, said process being conducted in the vapor phase by forming a reaction mixture of the nitrile, iodine, and oxygen, the iodine and oxygen being present in an amount of about 0.001 to about 0.1 mole and at least 0.01 mole, respectively, per mole of nitrile, passing said reaction mixture through a reactor containing two zones, the first zone being substantially inert with respect to iodine, and the second zone comprising a catalytic mass of a chromite of a metal of Groups II$a$, IV$a$, V$a$, I$b$ through VII$b$, and VIII of the Periodic Table of Elements, said reaction mixture being passed through the two zones at temperatures of from about 300 to about 1300°F and gaseous hourly space velocities of about 5 to about 1500 hrs$^{-1}$.

2. The process of claim 1 wherein at least one of said zones consists essentially of an elemental metal selected from the group consisting of titanium, tantalum, nickel, or alloys containing one or more of the foregoing.

3. A method according to claim 1 wherein the nitrile is propionitrile or isobutyronitrile.

4. A method according to claim 1 wherein the oxygen is present in the reaction mixture in a molar ratio of about 0.05 mole to about 3 moles per mole of nitrile present.

5. A method according to claim 1 wherein the reaction mixture is passed through the first zone at a temperature of from about 600°F to about 1200°F.

6. A method according to claim 1 wherein the reaction mixture is passed through the second zone at a temperature of from about 600°F to about 1200°F.

7. A method according to claim 1 wherein the first zone incorporates an inert material selected from the group consisting of clay, glass, ceramic, vermiculite, carborundum, pumice, silicon carbide, or granular rock, or a mixture thereof.

8. A method according to claim 1 wherein the catalytic mass consists essentially of copper chromite.

9. The process of claim 1 wherein the catalytic mass additionally includes oxides, hydroxides, or salts of the elements from group I$a$ of the Periodic Table of the Elements.

10. The process of claim 1 wherein the catalytic mass consists essentially of a mixture of barium chromite and copper chromite.

11. The process of claim 1 wherein the catalytic mass consists essentially of a mixture of nickel chromite and copper chromite.

12. The process of claim 1 wherein the catalytic mass consists essentially of a mixture of iron chromite and copper chromite.

13. The process of claim 1 wherein the catalytic mass consists essentially of iron chromite.

14. The process of claim 1 wherein the catalytic mass consists essentially of zinc chromite.

15. The process of claim 1 wherein the catalytic mass consists essentially of copper chromite and potassium carbonate.

16. A process for the preparation of methacrylonitrile from propylene consisting essentially of the following steps in combination:

a. Reacting propylene with hydrogen and carbon monoxide to produce a mixture of n-butyraldehyde and isobutyraldehyde, said reaction being conducted at molar ratios of hydrogen to carbon monoxide in the range of from about 1:1 to about 3:1, at temperatures between about 100 and 300°C and at pressures between 40 and 700 atmospheres, employing contact times of less than 10 minutes, said reaction being conducted in the presence of a catalyst selected from the group consisting of the salts of cobalt, copper, chromium, ruthenium, or rhodium;

b. Separating at least a portion of said isobutyraldehyde from said product mixture;

c. oxidizing at least a portion of said separated isobutyraldehyde to form isobutyric acid;

d. Converting at least a portion of said isobutyric acid to isobutyronitrile by reacting isobutyric acid with ammonia over a catalyst selected from the group consisting of natural or synthetic zeolites, alumina, silica gel, and mixtures thereof at temperatures at from about 200 to about 600°C and at pressures of from about 1 to about 100 atmospheres;

e. Oxydehydrogenating isobutyronitrile by the process of claim 1.

* * * * *